United States Patent
Zarian et al.

[11] Patent Number: 5,903,695
[45] Date of Patent: May 11, 1999

[54] LINEAR LIGHT FORM WITH LIGHT DIVERTING LAYER

[75] Inventors: James R. Zarian, Corona Del Mar; John A. Robbins, Lake Forest, both of Calif.

[73] Assignee: Lumenyte International Corp., Irvine, Calif.

[21] Appl. No.: 08/826,168

[22] Filed: Mar. 27, 1997

Related U.S. Application Data

[60] Provisional application No. 60/014,222, Mar. 27, 1996.

[51] Int. Cl.⁶ .................................................. G02B 6/22
[52] U.S. Cl. ........................................ 385/127; 385/11
[58] Field of Search .......................... 385/11, 127, 901, 385/37, 115, 100, 128, 102, 106; 362/32

[56] References Cited

U.S. PATENT DOCUMENTS

| | | | |
|---|---|---|---|
| 4,128,332 | 12/1978 | Rowe | 355/67 |
| 4,139,262 | 2/1979 | Mahlein et al. | 385/127 |
| 4,422,719 | 12/1983 | Orcutt | 350/96.3 |
| 4,466,697 | 8/1984 | Daniel | 350/96.3 |
| 4,553,815 | 11/1985 | Martin | 350/96.23 |
| 4,637,686 | 1/1987 | Iwamoto et al. | 350/96.29 |
| 4,763,984 | 8/1988 | Awai et al. | 350/96.24 |
| 4,816,968 | 3/1989 | Yamada et al. | 362/80 |
| 4,889,400 | 12/1989 | Pinson | 350/96.3 |
| 4,901,209 | 2/1990 | Nitz | 362/72 |
| 4,924,612 | 5/1990 | Kopelman | 40/547 |
| 4,957,347 | 9/1990 | Zarian | 350/96.32 |
| 5,009,020 | 4/1991 | Watanabe | 40/547 |
| 5,027,259 | 6/1991 | Chujko | 362/32 |
| 5,052,778 | 10/1991 | Zarian | 385/125 |
| 5,067,831 | 11/1991 | Robins et al. | 385/123 |
| 5,122,580 | 6/1992 | Zarian et al. | 526/64 |
| 5,149,467 | 9/1992 | Zarian | 264/1.5 |
| 5,221,387 | 6/1993 | Robbins et al. | 156/85 |
| 5,225,166 | 7/1993 | Zarian et al. | 422/109 |
| 5,298,327 | 3/1994 | Zarian et al. | 428/373 |
| 5,333,288 | 7/1994 | Kingstone | 385/100 |
| 5,363,470 | 11/1994 | Wortman | 385/147 |
| 5,377,292 | 12/1994 | Bartling et al. | 385/128 |
| 5,381,505 | 1/1995 | Fischietoo et al. | 385/128 |
| 5,400,225 | 3/1995 | Currie | 362/32 |
| 5,430,621 | 7/1995 | Raskas | 362/32 |
| 5,570,447 | 10/1996 | Liu | 385/125 |
| 5,579,429 | 11/1996 | Naum | 385/143 |
| 5,585,782 | 12/1996 | Yosko | 340/471 |

*Primary Examiner*—Hung N. Ngo
*Attorney, Agent, or Firm*—Small Larkin, LLP

[57] ABSTRACT

The present invention relates to a fiber optic conduit having a light diverting outer layer that reflects and/or refracts ambient light directed towards the conduit. The fiber optic conduit includes a light transmitting core, cladded with a fluoropolymer cladding and subsequently jacketed with a polymeric finish jacket. A light diverting layer either inserted between the cladding and the jacket or surrounding the jacket is included in the fiber optic conduit. The light diverting layer preferably has the property of allowing light to be transmitted from the fiber optic surface out of the conduit in one direction and reflecting ambient light directed towards the conduit. When reflecting ambient light, the fiber optic conduit appears in the form of chrome trim.

27 Claims, 4 Drawing Sheets

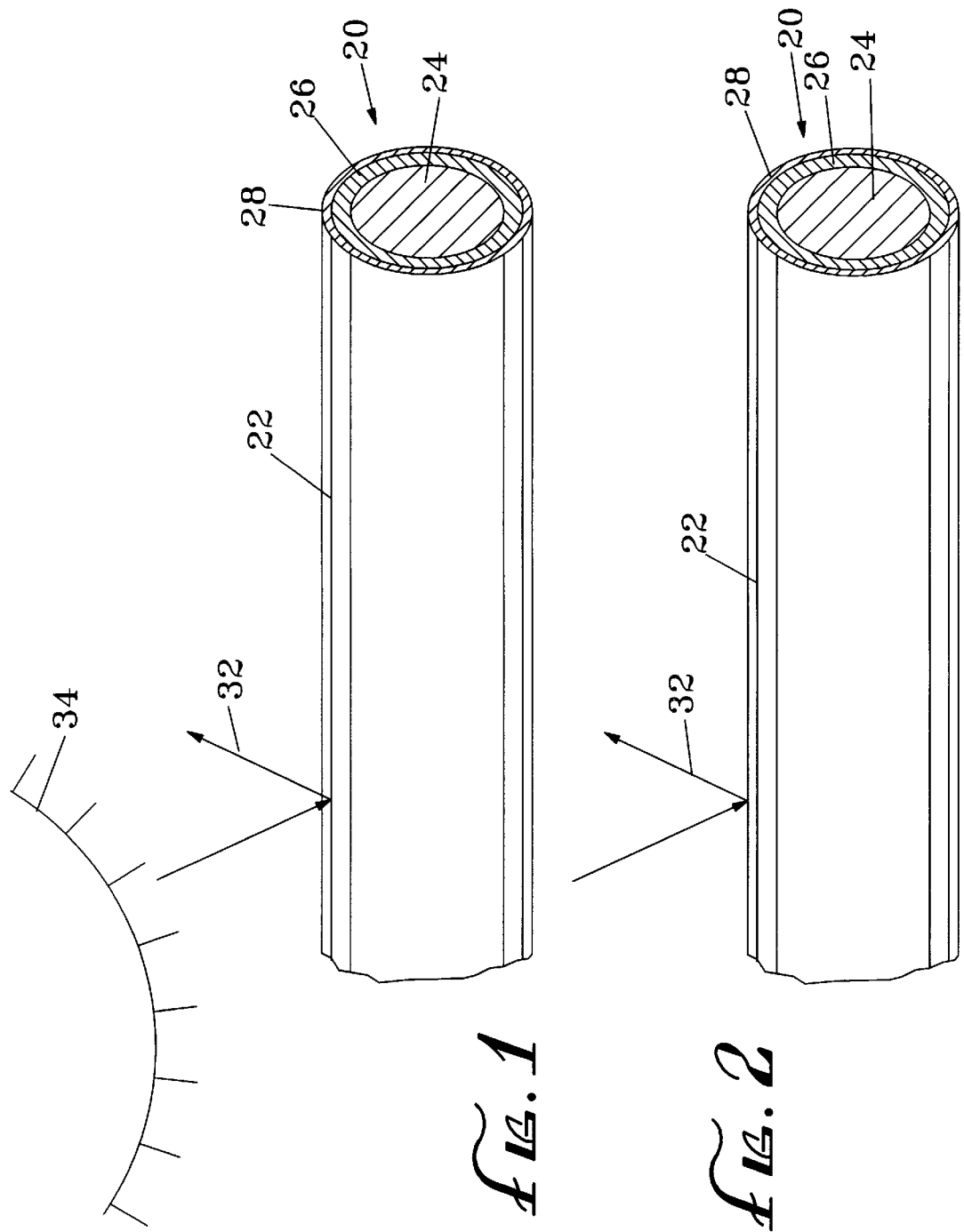

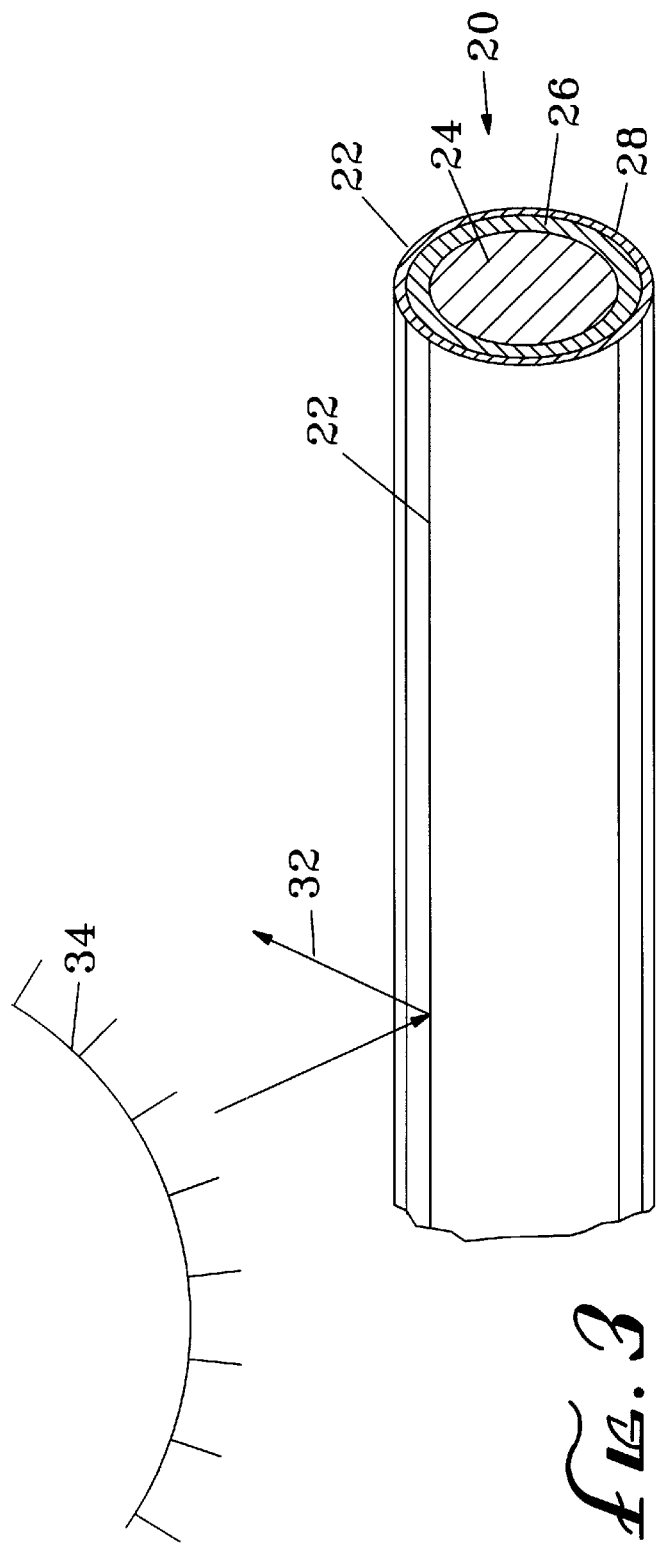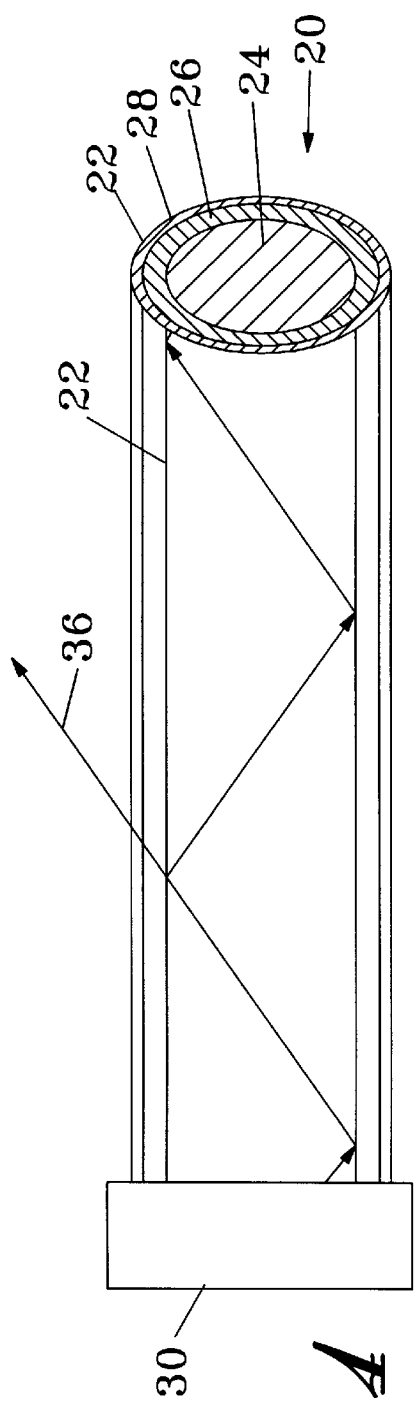

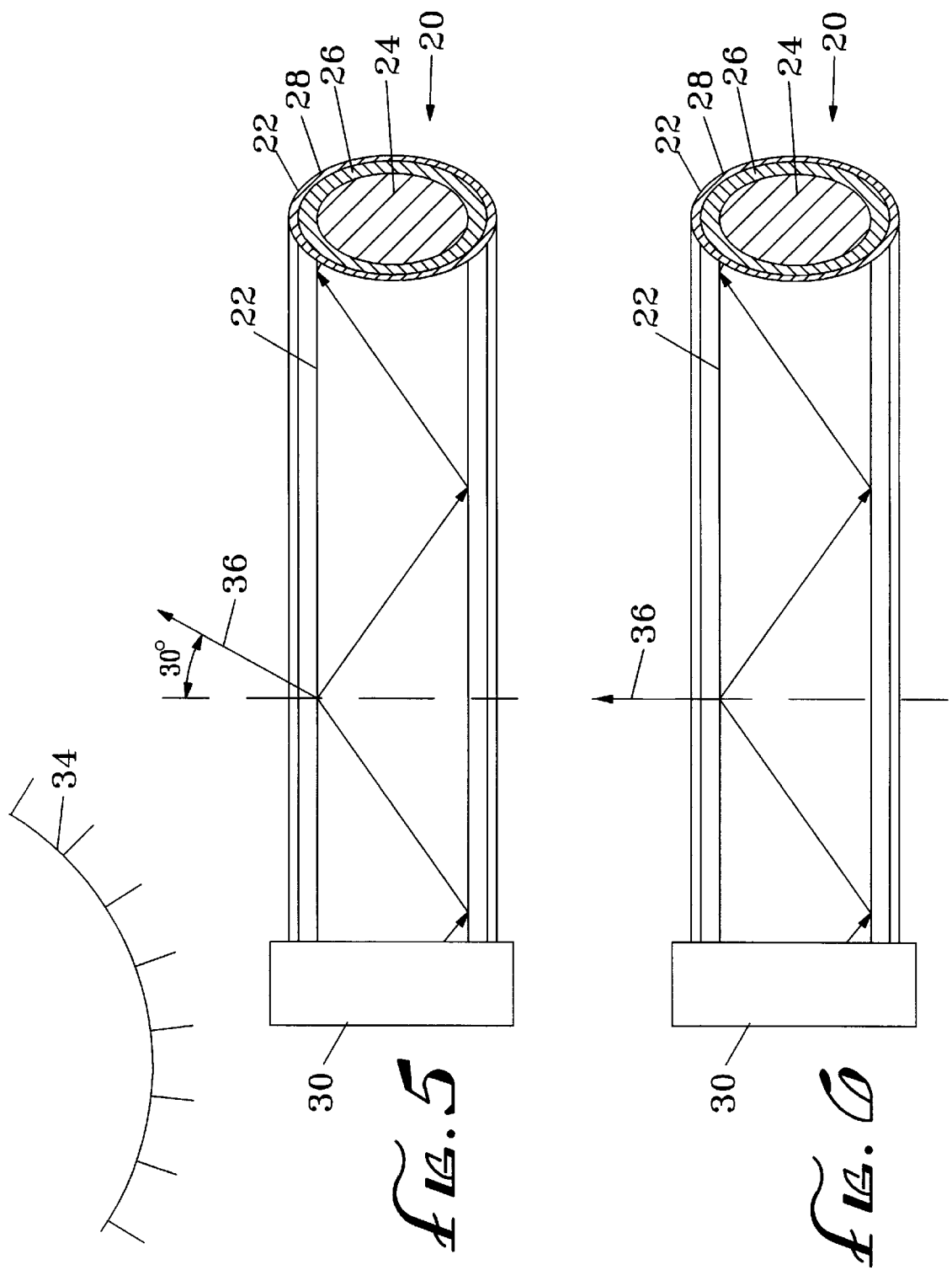

LINEAR LIGHT FORM WITH LIGHT DIVERTING LAYER

CROSS REFERENCE TO RELATED APPLICATIONS

This application claims the benefit of U.S. Provisional Application, Ser. No. 60/014,222, filed on Mar. 27, 1996 which is incorporated herein by reference.

BACKGROUND OF THE INVENTION

A. Field of the Invention

The present invention relates to linear light forms and their methods of manufacture. More particularly the present invention relates to linear light forms having a fiber optic conduit with a light diverting outer layer and to the manufacturing processes thereof.

B. Description of the Prior Art

With the advent of modern lighting systems, the demand for fiber optic light conduits, also known as linear light forms, is growing. In modern lighting systems it is desirable to obtain energy efficiency and low maintenance, both of which are provided by linear light forms.

Types of linear light forms include those having a clear jacketing that is co-extruded tightly about single and/or multiple large core fiber optics. The light is transmitted, or conveyed through the fiber optics and emitted, or released, by reflection or refraction out the sides of the fiber optic conduit. The advantages of this configuration, in which a transmissive, finish jacket is co-extruded tightly about the fiber optic core, are numerous. In another type of linear light form, single or multiple thermoplastic fiber optics are encased in a clear polymeric tubing. In yet another type of linear light form, a reflective hollow tubing is intertwined with single or multiple thermoplastic fiber optic cores.

While each of the aforementioned lighting systems are suitable for their intended lighting application, often it is undesirable to view the lighting assembly when it is not in use, typically during periods of daylight. When viewed by ambient light, the linear light form often detracts from a desired daylight look or effect. A wall or other object decorated with the linear light form to obtain a highlighted or enhanced lighting effect at night often may appear crowded or undesirable when viewed with ambient light during the day.

When these linear light forms are observed in ambient light, and without being illuminated themselves, it may be undesirable to keep them within view because they appear as clear tubing and do not offer a desirable aesthetic and/or functional appearance. These disadvantages limit their desirability for use in the sign industry, emergency vehicles, and traffic management among others.

Another disadvantage exists in applications where the linear light form has to be blended into a background such as side molding of cars or on architectural structures. The linear light forms existing today may not offer the desired aesthetic properties and/or may actually detract from their use during the daytime.

Yet another disadvantage relates to the angle of view where it is desirable to direct light from the illuminated linear light forms to a desired location and/or to mask light from projection to other locations.

SUMMARY OF THE INVENTION

It is an object of the present invention to divert ambient light intercepting a linear light form.

It is another object of the present invention to control the direction of light transmitted out of the linear light form.

The present invention relates to a linear light form including light diverting outer layers. Light transmitted out of the light form or projected onto the light form can be diverted by the outer layers.

In one example, the present invention is embodied in a linear light form including a light transmitting core, clad with at least one light transmitting outer layer and the clad core jacketed with a dichroic film. The dichroic film has the property of allowing light transmitted within the clad core to pass out of or be emitted from the linear light form, but of reflecting ambient light directed toward the linear light form from an external source.

Preferably, the linear light forms embodying the present invention exhibit a different appearance when observed in ambient light, or when illuminated from an outer light source compared to their appearance when transmitting and projecting light from the core, i.e., internally. Linear light forms with light diverting surfaces exhibiting this characteristic are desirable in applications where the linear light form is in public view.

Alternatively, the present invention is embodied in a linear light form that includes a plurality of light transmitting cores, each clad with a light transmitting outer layer and subsequently jacketed, collectively, as a bundle, with a finish jacket. The bundle of light transmitting clad cores is additionally jacketed with a dichroic film whereby the film has the property of allowing light to radiate outward from the plurality of the clad core fiber optics to the outer surface of the linear light form in one direction; but to reflect ambient light directed toward the jacketed bundle from outside the clad core.

In another alternative embodiment of the present invention, a linear light form includes a thermoset, light transmitting core, clad with an outer layer which is covered with a light control film. The film has the property of allowing light emitted from the fiber optic surface to be visible at a certain viewing angle, while blocking the light from other viewing angles.

BRIEF DESCRIPTION OF THE DRAWINGS

Other objects and advantages of the invention will become apparent from the foregoing detailed description taken in connection with the accompanying drawings, in which FIG. 1 is a partial perspective view of a linear light form of the present invention with a light diverting layer underlying a jacket to divert ambient light;

FIG. 2 is a partial perspective view of an alternative embodiment of the present invention with a light diverting layer surrounding a jacket to divert ambient light;

FIG. 3 is a partial perspective view of another alternative embodiment of the present invention with a light diverting layer formed on a cladding to divert ambient light;

FIG. 4 is a partial perspective view of an alternative embodiment of the present invention transmitting light;

FIGS. 5 and 6 are partial perspective views of alternative embodiments of present invention transmitting light in predetermined directions.

DESCRIPTION OF THE PREFERRED EMBODIMENTS

Figure 7:
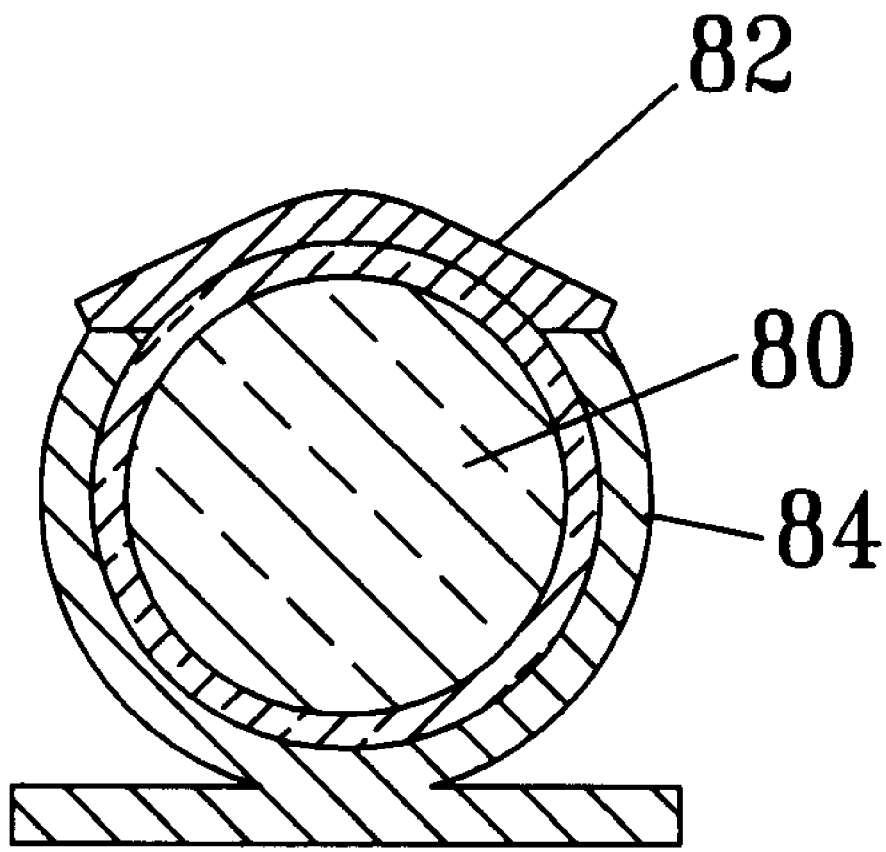
FIG. 7 is a cross-sectional end view of an alternative embodiment of the present invention housed in a channel and covered by a polar mirror.

As shown in the drawings for purposes of illustration, the invention relates to a linear light form 20 having a light diverting layer 22. The linear light form 20 (FIGS. 1–4) includes, generally, a fiber optic core 24 or cores, a light transmissive fluoropolymer cladding layer 26 about the core(s) 24. A jacket material 28 of the polymeric type is formed about the core(s) 24 and cladding material 26. Advantageously, the light diverting layer 22 includes reflective, refractive or dichroic and/or polarizing materials that alone or in combination cause light to be diverted in a desired direction. Reference to the terms "reflective" and "refractive", when used to describe the novel features of the light diverting layer of the present invention, refer to characteristics of the layer that refract or reflect ambient light or view of the view of the light being transmitted out of the fiber directed toward the core, but from outside of and through the jacket and clad, rather than light 36 transmitted through the core by an illumination system 30. For example, ambient light, indicated by line 32, may be provided in the form of sunlight from the sun 34, and the light diverting layer 22 is said to refract or reflect this light.

The position of the light diverting layer 22 may be immediately overlying the cladding layer 26 (not shown), on a film 22 encompassing the cladding layer 26 (FIG. 1); directly on the exterior surface of jacketing material 28 deposited onto the cladding 26 (FIG. 2), inter-layered between jacketing materials encompassing the clad-core (not shown) or on the outer surface of the jacketing(s) 28 (FIG. 2).

Conventional linear light forms 20 may be prepared in accordance with the present invention using linear light forms, apparatus, composition and methods of manufacture of the type described in U.S. Pat. Nos. 4,763,984; 4,957,347; 5,052,778; 5,067,831; 5,149,467; 5,221,387; 5,225,166; 5,122,580; and 5,298,327 which are incorporated herein by reference. The process of manufacturing of linear forms with a light diverting layer can be done in a continuous or static (discrete) manner and by the use of adhesives, deposition, painting, co-extrusion, tandem extrusion and other equivalent means.

The linear light forms of the type described above that are particularly beneficial can include, but are not limited to, light forms composed of: a thermoset light transmitting core cladded by a fluoropolymer; a plurality of thermoset light transmitting cores each cladded by a fluoropolymer; a thermoplastic light transmitting core clad with a fluoropolymer; a plurality of thermoplastic light transmitting cores each clad with a fluoropolymer; a reflective or refractive linear configuration intertwined within a plurality of light transmitting cores each clad with a fluoropolymer; a thermoset light transmitting core clad by a fluoropolymer and jacketed with a polymeric finish jacket such as poly(vinyl chloride), polyacrylate, polymethacrylate, polycarbonate, silicone, among other suitable polymers; a plurality of thermoset light transmitting cores each clad with a fluoropolymer and jacketed with a polymeric finish jacket such as poly(vinyl chloride), polyacrylate, polymethacrylate, polycarbonate, silicone, among other suitable polymers; a thermoplastic light transmitting core clad with a fluoropolymer and jacketed with a polymeric finish jacket such as poly(vinyl chloride), polyacrylate, polymethacrylate, polycarbonate, silicone, among other suitable polymers; a plurality of thermoplastic light transmitting cores each clad with a fluoropolymer and in combination held together by a polymeric material and jacketed by a polymeric finish jacket such as poly(vinyl chloride), polyacrylate, polymethacrylate, polycarbonate, silicone, among other suitable polymers; a reflective or refractive linear configuration intertwined within a plurality of light transmitting cores each clad with a fluoropolymer and in combination held together by a polymeric material and jacketed with a polymeric finish jacket such as poly(vinyl chloride), polyacrylate, polymethacrylate, polycarbonate, silicone, among other suitable polymers; and any combinations thereof.

The reflective, refractive, polarizing or dichroic materials particularly beneficial as a light diverting layer 22 (FIGS. 1–4) can include, but are not limited to: films that have a reflective or refractive surface; polarizing materials that divert light at a certain angle; dichroic materials that filter out some frequencies of light while allowing other frequencies of light to pass through; holograms specifically designed to project an image; refractive materials capable of refracting light in certain direction; reflective materials placed at intervals onto or within the linear light form.

In order to provide a more detailed description of the present invention, the following examples and embodiments illustrate the linear light form having a light diverting layer and provide a description of the unique effects achieved from using a light diverting layer.

EXAMPLE 1

A 1.2 m section of a linear light form of the type sold under model no. FC-501 (jacketed clad core) manufactured by Lumenyte International Corporation, Costa Mesa, Calif., was combined with a light diverting layer. Onto the middle of the 1.2 m section, a length of approximately 0.6 m long reflective film of the type sold under model no. HRS 241 (Gila Sunshine Window Film) manufactured by Courtaulds Performance Films, Martinsville, Va., was applied according to the instructions provided by the manufacturer. The combination was then connected to an illumination system 30 (FIG. 4) and energized to transmit light out of the conduit. When the illuminated combination was viewed in the dark illumination provided by a conventional illumination system of the type sold under model no. PH-1000 illuminator with and/or wheel, by Lumenyte International Corp., the light transmitting properties and color changing characteristic inherent in conventional linear light forms was observed. The light diverting layer had little or no effect on the light transmitting properties of the linear light form. When the illuminator was turned off, and the combined linear light form with light diverting layer was observed in ambient light (FIG. 2), the middle 0.6 m section with the light diverting layer appeared as reflective while the uncovered areas appeared clear. Additionally, when the combination was kept illuminated, and in turn illuminated by an external fiber optic source, the area covered reflected the light coming from the external light source, whereas the area appeared as a clear tubing.

EXAMPLE 2

A 1.2 m section of a linear light form of the type sold under model no. RB-501 (clad core, no finish jacket) and manufactured by Lumenyte International Corporation, Costa Mesa, Calif., was combined with the same reflective film, and applied as in Example 1 above. The same results were observed.

EXAMPLE 3

A 1.2 m section of a linear light form of the type sold under model no. FC-501 and manufactured by Lumenyte International Corporation, Costa Mesa, Calif., was selected, the finish jacketing was slit open along the length of the linear light form, the poly(vinyl chloride) jacket was removed, and fiber optic with the fluoropolymer cladding exposed was used as the starting linear light form with the same reflective film, and applied as in Example 1 above. The removed poly(vinyl chloride) was placed back onto the combination. The same results were observed as outlined in Example 1, except that the reflective layer, between the cladding and jacket did not appear as shiny as in Examples 1 and 2.

EXAMPLE 4

A section of a linear light form of the type sold under model no. WN-400 optic (a core surrounded by a teflon® clad) and manufactured by Lumenyte International Corporation, Costa Mesa, Calif., was selected, a 15 cm portion of the linear light form was wrapped with a layer of light diverting film sold under model, Edmund Scientific Holographic no. 52990 and supplied by Edmund Scientific, Barrington, N.J. The wrapped portion when exposed to sun light exhibited a extremely slight varying color (like a rainbow). When the linear light form was illuminated with an illumination system similar to the combination described in Example 1 in the dark, the color changing characteristics inherent in conventional linear light forms were observed and the section wrapped by the film appeared to produce illumination in substantially the same way as the rest of the linear light form.

EXAMPLE 5

A section of a linear light form 80 of the type sold under model no. WN-400 optic, and manufactured by Lumenyte International Corporation, Costa Mesa, Calif., was combined with a polarizing mirror light diverting layer 82, 5 cm in length and approximately 1 cm in width of type sold under model, Edmund Scientific Polar Mirror no. 43683 and supplied by Edmund Scientific, Barrington, N.J. The light diverting layer was fastened conventionally to the linear light form (FIG. 7). The polar mirror material comprising the light diverting layer could not be wrapped because of the thickness of the film. It was discovered that the linear light form can be placed in a channel 84, conventionally, and the light diverting layers thereafter could be arranged exterior to, and overlying, the channels. The linear light form was observed under the same light conditions as Example 1 and the same light diverting results as in example 1 where observed.

EXAMPLE 6

A section of a linear light form (FIG. 5) of the type sold under model no. WN-400 optic, and manufactured by Lumenyte International Corporation, Costa Mesa, Calif., was combined with a light diverting layer 22, 5 cm in length and approximately 1 cm in width of type sold under model no. 3M Light Control Film (30 degree angle) 52391 by Edmund Scientific, Barrington, N.J. The Light Control Film allows light to be directed out of the linear light form at an angle 30 degrees from normal. The light diverting layer 22 was fastened to the linear light form such that the light diverting layer was overlying or covering the linear light form. The portion covered with the control film when illuminated by an illumination system 30, as in Example 1, could not be viewed perpendicular to the longitudinal axis of the linear light form, or from one direction parallel to the longitudinal axis of the linear light form at any angle; however it could only be observed to be illuminated, i.e. transmitting light 36, from the opposite direction within an arc, or a narrow angle range generally at 30 degrees from perpendicular.

EXAMPLE 7

A section of a linear light form (FIG. 6) of the type sold under model no. WN-400 optic, and manufactured by Lumenyte International Corporation, Costa Mesa, Calif., was combined with a light diverting layer, 5 cm in length and approximately 1 cm in width of the type sold under model no. 3M Light Control Film (0 degree angle) 52390 by Edmund Scientific, Barrington, N.J. The Light Control Film allows light to be directed out of the linear light form at an angle normal to the surface of the film. The light diverting layer was fastened to the linear light form such that the light diverting layer was overlying or covering the linear light form. The portion of the linear light form covered with the control film when illuminated by an illumination system 30 was viewed to transmit light 36 perpendicular to the longitudinal axis of the linear light form, but as the viewing angle was moved from perpendicular in either direction, the light 36 transmitted from linear light form seemed to be dimmer and eventually the light became invisible after about 30 degrees from perpendicular.

EXAMPLE 8

A section of a linear light form of the type sold under model no. WN-400 optic, and manufactured by Lumenyte International Corporation, Costa Mesa, Calif., was combined with a light diverting layer. A 15 cm portion of the linear light form was wrapped with a light diverting layer of the type sold under model, Edmund Scientific Diffraction Grating no. 40267 supplied by Edmund Scientific, Barrington, N.J. The wrapped portion when exposed to sun light exhibited a varying color (like a rainbow) more pronounced than the effect observed in Example #4 above. When the linear light form was illuminated the section wrapped by the film appeared to transmit light out of the linear light form in substantially the same manner as the uncoated portion of the linear light form.

PROCESSES FOR PRODUCTION OF LINEAR LIGHT FORMS WITH LIGHT DIVERTING LAYERS

The techniques particularly beneficial to manufacturing a linear light form with a light diverting layer can include, but are not limited to, pressing dichroic films onto the outer surface of the linear light forms, deposition of reflective or refractive materials at reduced pressure at room temperature, embossing of holographic patterns on the outer surface of the light forms, application of holograms at intervals onto the surface of the linear light forms by pressing a film including the hologram among others. All the above techniques can be used in a continuous manner during manufacture of the linear light form.

Other conventional techniques may be used to apply the light diverting materials. For example, vacuum deposition both at room temperature and under reduced pressure, or at higher or lower temperatures, may be used to deposit a layer of a reflective material onto the cladding or jacketing materials. Alternatively, the light diverting layer may be applied to a film and adhered to the cladding prior to jacketing. The film may, alternatively be wrapped around the cladding prior to the application of a jacketing material by a co-extrusion process, for example, to integrate the different components into position. Yet again, a light diverting material may be adhered to the outer surface of a jacketing material that has already been extruded over a clad-core combination.

Other placement combinations and/or techniques can be used within the scope of the present invention as long as the light diverting layer positioned and/or manufactured produces the desired light diverting effect for the application.

The light diverting layers on linear light forms are particularly useful in automobile, traffic management, sign, military, architectural among other applications. In each case when ambient light, either from sunlight light during the day or headlights at night, is projected upon the linear light form it will reflect or refract the ambient light thereby providing the look of chrome trim or if a holographic reflector is used then a fanciful design, or if reflective surface is used then an identifiable outline. The purpose is to keep the linear light form visibly pronounced even when receiving ambient light. This is particularly desirable in applications where the linear light form is used to identify a vehicle, the perimeter of roads or other objects at night or other object at night to other motorists. In the absence of a light diverting layer, the linear light form would not assist in identifying the object it was intended to highlight and/or be bleached out.

In the case of certain traffic signs or emergency vehicles, it may be desirable to direct the path of light from the linear light form so that only those motorists that need to view a particular signal or sign on the freeway will be able to view the light transmitted out of the linear light form. In such instances the polarized light diverting layer maybe desirable.

In the case of certain traffic management applications, for example in outlining road ways, it may be desirable to use a reflective outer layer so that the road is outlined at night; however, when the light from other motorists' headlights is projected onto the light form, the surface reflects the light back still making the outline of the road visible. Without the reflective layer, the road outline when exposed to the headlight will be bleached out rendering the ultimate application, namely warning the motorist, not as effective.

While the present invention has been described in connection with what are presently considered to be the most practical, and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A fiber optic linear light form comprising:
    a light transmitting core;
    a light transmitting cladding; and
    at least one layer surrounding said linear light form, said layer adapted to control light by permitting relatively high transmission of light radially outward from the core and by limiting transmission of light incoming from ambient to a relatively low transmission.

2. The fiber optic linear light form of claim 1 wherein said layer is adapted to allow light transmitted through said core to pass radially out of said linear light form and to reflect incoming ambient light directed toward said linear light form.

3. The fiber optic linear light form of claim 2 wherein said layer is a dichroic film.

4. The fiber optic linear light form of claim 2 wherein said layer is a reflective film.

5. The fiber optic linear light form of claim 2 wherein said layer is a refractive film.

6. The fiber optic linear light form of claim 2 wherein said layer is a holographic film.

7. The fiber optic linear light form of claim 2 wherein said layer is a polarizing film.

8. The fiber optic linear light form of claim 4 further including a plurality of linear light form layers including a dichroic film, a refractive film and/or a polarizing film.

9. The fiber optic linear light form of claim 1 wherein said layer is adapted to direct light radiating outward from said core in a predetermined direction.

10. The fiber optic linear light form of claim 9 wherein said layer is adapted to reflect ambient light directed toward said fiber optic linear light form.

11. The fiber optic linear light form of claim 10 wherein said layer is adapted to diffract ambient light reflected off said fiber optic linear light form.

12. A fiber optic linear light form comprising:
    a light transmitting core;
    a light transmitting cladding; and
    a light control film positioned on said cladding;
    said film adapted to allow light emitted radially outward from said core to be transmitted through said film and to be visible at a predetermining viewing angles, but not to be visible from other viewing angles.

13. The fiber optic linear light form of claim 12 wherein said light control film is a polarizing film.

14. A fiber optic linear light form comprising:
    a plurality of light transmitting cores;
    a plurality of light transmitting claddings, each of said claddings surrounding each of said cores;
    a finish jacket surrounding said cores collectively, as a bundle; and
    a light diverting layer jacketed about said finish jacket;
    said light diverting layer adapted to control light by permitting relatively high transmission of light radially outward from the plurality of the fiber optics to the outer surface of said linear light form and by limiting transmission of ambient light directed inward toward said cores to a relatively low transmission.

15. The fiber optic conduit of claim 14 wherein said light diverting outer layer is a dichroic film.

16. The fiber optic conduit of claim 14 wherein said light diverting outer layer is a holographic film.

17. The fiber optic conduit of claim 14 wherein said light diverting outer layer is a polarized film.

18. A method of manufacturing a fiber optic linear light form comprising the steps of:
    forming a light transmitting core;
    forming at least one light transmitting outer layer about said core; and
    applying a light diverting layer about said linear light form and light transmitting outer layers, said layer adapted to control light by permitting relatively high transmission of light radially outward from the core and to divert incoming ambient light in a predetermined way different from the way in which light radiating outward from the core is controlled.

19. The method of claim 18 wherein said step of applying said light diverting layer includes the step of pressing said light diverting film onto the outer surface of the linear light form.

20. The method of claim 18 wherein said step of applying said light diverting layer includes the step of embossing said light diverting layer onto the outer surface of the linear light form.

21. The method of claim 18 wherein said step of applying said light diverting layer includes the step of adhering said light diverting layer onto the outer surface of the linear light form.

22. The method of claim 18 wherein said step of applying said light diverting layer uses vacuum deposition.

23. The method of claim 18 wherein the step of applying said light diverting is performed at a reduced air pressure.

24. The method of claim 18 wherein the step of applying said light diverting layer includes the step of wrapping a film of said light diverting layer about said linear light form.

25. The method of claim 18 wherein the step of applying said light diverting layer includes the step of placing said linear light form in a channel; and placing said layer to overlie said channel and said linear light form.

26. A fiber optic linear light form adapted for use on a sign comprising:

a light transmitting core;
   a cladding surrounding said core;
   a finish jacket surrounding said cladding; and
   a light diverting layer about said finish jacket, said layer adapted to permit transmission of light radiating outward from the core and to divert, in a predetermined, relatively non-transmissive way, incoming ambient light.

27. The linear light form of claim 26 further including said linear light form being configured into a predetermined shape and positioned into a sign whereby ambient sunlight is reflected off of said layer.

* * * * *